US 9,346,488 B2

(12) United States Patent
Kozawa

(10) Patent No.: US 9,346,488 B2
(45) Date of Patent: May 24, 2016

(54) ELECTRONIC CONTROL SYSTEM

(71) Applicant: DENSO CORPORATION, Kariya, Aichi-pref. (JP)

(72) Inventor: Takaharu Kozawa, Konan (JP)

(73) Assignee: DENSO CORPORATION, Kariya (JP)

( * ) Notice: Subject to any disclaimer, the term of this patent is extended or adjusted under 35 U.S.C. 154(b) by 33 days.

(21) Appl. No.: 14/468,637

(22) Filed: Aug. 26, 2014

(65) Prior Publication Data

US 2015/0066301 A1   Mar. 5, 2015

(30) Foreign Application Priority Data

Aug. 28, 2013  (JP) ................... 2013-176850

(51) Int. Cl.
*B62D 5/04* (2006.01)

(52) U.S. Cl.
CPC .............. *B62D 5/049* (2013.01); *B62D 5/0463* (2013.01)

(58) Field of Classification Search
CPC ............................................ B62D 5/00–5/32
See application file for complete search history.

(56) References Cited

U.S. PATENT DOCUMENTS

| 2010/0114452 A1* | 5/2010 | Bauerle ................ F02D 11/106 701/102 |
| 2011/0015825 A1* | 1/2011 | Yamaura .............. B62D 5/0493 701/33.4 |

FOREIGN PATENT DOCUMENTS

| JP | 60-093844 | 5/1985 |
| JP | 2002-274404 | 9/2002 |
| JP | 2007-161006 | 6/2007 |
| JP | 2007-161141 | 6/2007 |
| JP | 2007-286786 | 11/2007 |

OTHER PUBLICATIONS

Office Action (2 pages) dated Jul. 14, 2015, issued in corresponding Japanese Application No. 2013-176850 and English translation (2 pages).
"Surface Vehicle Information Report" Single Edge Nibble Transmission for Automotive Applications, issued by SAE International, 2007, J2716 Jan. 2010, 56 pgs.
"TLE4998C3C" Programmable Linear Hall Sensor, Data Sheet, Rev 1.1, published by Infineon Technologies AG, Sep. 2009, Edition Sep. 2009, 42 pgs.
Office Action (1 page) dated Mar. 1, 2016, issued in corresponding Japanese Application No. 2013-176850 and English translation (1 page).

(Continued)

*Primary Examiner* — James Trammell
*Assistant Examiner* — Adam Mott
(74) *Attorney, Agent, or Firm* — Nixon & Vanderhye PC

(57) ABSTRACT

An electronic control system in which a sensor transmits a data to a control unit is provided. In one embodiment, the sensor includes a first detector and a second detector each converting a physical quantity of a detection target into a digital data. An output portion of the sensor outputs in turn a normal data and a monitor data associated with each other. The normal data is the digital data outputted from the first detector, and the monitor data is a reversed data of the digital data outputted from the second detector. The control unit determines that at least one of the first detector, the second detector and the output portion has failure when the reversed data does not match the normal data.

7 Claims, 9 Drawing Sheets

(56) References Cited

OTHER PUBLICATIONS

Office Action (2 pages) dated Dec. 1, 2015, issued in corresponding Japanese Application No. 2013-176850 and English translation (3 pages).

Kramolis, Freescale Semiconductor, "Sent/SPC Driver for the MPC5510 Microcontroller Family", AN4219, 2010, p. 1,2,4, URL:http://www.freescale.com/files/microcontrollers/doc/app_note/AN4219.pdf (27pages).

* cited by examiner

FIG. 7

| NRML DATA | | REVERSED DATA | | SUM OF PERIODS |
|---|---|---|---|---|
| BIT STRING | PULSE PERIOD | BIT STRING | PULSE PERIOD | |
| 0000 | 12[tick] | 1111 | 27[tick] | 39[tick] |
| 0001 | 13[tick] | 1110 | 26[tick] | 39[tick] |
| 0010 | 14[tick] | 1101 | 25[tick] | 39[tick] |
| 0011 | 15[tick] | 1100 | 24[tick] | 39[tick] |
| 0100 | 16[tick] | 1011 | 23[tick] | 39[tick] |
| 0101 | 17[tick] | 1010 | 22[tick] | 39[tick] |
| 0110 | 18[tick] | 1001 | 21[tick] | 39[tick] |
| 0111 | 19[tick] | 1000 | 20[tick] | 39[tick] |
| 1000 | 20[tick] | 0111 | 19[tick] | 39[tick] |
| 1001 | 21[tick] | 0110 | 18[tick] | 39[tick] |
| 1010 | 22[tick] | 0101 | 17[tick] | 39[tick] |
| 1011 | 23[tick] | 0100 | 16[tick] | 39[tick] |
| 1100 | 24[tick] | 0011 | 15[tick] | 39[tick] |
| 1101 | 25[tick] | 0010 | 14[tick] | 39[tick] |
| 1110 | 26[tick] | 0001 | 13[tick] | 39[tick] |
| 1111 | 27[tick] | 0000 | 12[tick] | 39[tick] |

FIG. 9

| NRML DATA | | REVERSED DATA | | SUM OF PERIODS |
|---|---|---|---|---|
| BIT STRING | PULSE PERIOD | BIT STRING | PULSE PERIOD | |
| 0000 | 12[tick] | 0000 | 12[tick] | 24[tick] |
| 0001 | 13[tick] | 0001 | 13[tick] | 26[tick] |
| 0010 | 14[tick] | 0010 | 14[tick] | 28[tick] |
| 0011 | 15[tick] | 0011 | 15[tick] | 30[tick] |
| 0100 | 16[tick] | 0100 | 16[tick] | 32[tick] |
| 0101 | 17[tick] | 0101 | 17[tick] | 34[tick] |
| 0110 | 18[tick] | 0110 | 18[tick] | 36[tick] |
| 0111 | 19[tick] | 0111 | 19[tick] | 38[tick] |
| 1000 | 20[tick] | 0111 | 19[tick] | 39[tick] |
| 1001 | 21[tick] | 0110 | 18[tick] | 39[tick] |
| 1010 | 22[tick] | 0101 | 17[tick] | 39[tick] |
| 1011 | 23[tick] | 0100 | 16[tick] | 39[tick] |
| 1100 | 24[tick] | 0011 | 15[tick] | 39[tick] |
| 1101 | 25[tick] | 0010 | 14[tick] | 39[tick] |
| 1110 | 26[tick] | 0001 | 13[tick] | 39[tick] |
| 1111 | 27[tick] | 0000 | 12[tick] | 39[tick] |

ELECTRONIC CONTROL SYSTEM

CROSS REFERENCE TO RELATED APPLICATION

The present application is based on Japanese Patent Application No. 2013-176850 filed on Aug. 28, 2013, disclosure of which is incorporated herein by reference.

TECHNICAL FIELD

The present disclosure relates to an electronic control system in which a control unit performs data processing based on a data transmitted from a sensor.

BACKGROUND

In a known method, a negative data as well as a positive data are transmitted from a sensor to a control unit. In the above method, the positive data is a data to be transmitted, and the negative data is a reversed data of the positive data. In this method, by performing comparison between the positive data and the negative data on a bit basis, it becomes possible to determine whether or not the data is changed during transmission, that is, whether the transmitted data has an error.

In Patent Document 1, the sensor generates the positive data and the negative data with different data generation circuits. Thus the control unit can detect a data error resulting from failure of the data generation circuit.

Patent Document 1: JP-S60-93844A

In Patent Document 1, the positive data and the negative data are based on a same data which is set by a data setting circuit. The data which is set by the data setting circuit is converted from an electric signal outputted from a detector of the sensor. Therefore, when the detector of the sensor fails, the positive data and the negative data are generated based on an error-contained-data which is set by the data setting circuit. In this case, the control unit determines that the transmitted data is correct. Thus the data error resulting from failure of the detector of the sensor cannot be detected and the data transmitted to the control unit has low reliability.

SUMMARY

The present disclosure is made in view of the foregoing. It is an object of the present disclosure to provide an electronic control system that can improve reliability of a data transmitted from a sensor to a control unit.

An electronic control system of one example of the present disclosure comprises a control unit and a sensor transmitting a data to the control unit via a transmission line. The sensor includes a first detector and a second detector each converting a physical quantity representing a state of a detection target into a digital data. The sensor further includes an output portion outputting in turn a normal data and a monitor data associated with each other to the transmission line. The normal data is the digital data outputted from the first detector. The monitor data is, unconditionally or when a predetermined condition is met, a reversed data of the digital data outputted from the second detector.

The control unit includes a failure determination portion. The failure determination portion determines that at least one of the first detector, the second detector, the output portion and the transmission line has failure when the monitor data is the reversed data of the digital data outputted from the second detector and a reversed data of the monitor data does not match the normal data. The failure determination portion determines that at least one of the first detector, the second detector, the output portion and the transmission line has failure when the monitor data is not the reversed data of the digital data outputted from the second detector and the monitor data does not match the normal data.

According to the above electronic control system, the normal data is based on the digital data outputted from the first detector, and the monitor data is based on the digital data outputted from the second detector. Therefore, for example, when the first detector has failure, it is possible to detect an error of the data based on a corresponding-bit mismatch between the transmitted normal data and monitor data. Therefore, it is possible to improve the reliability of the data transmitted from the sensor to the control unit.

BRIEF DESCRIPTION OF THE DRAWINGS

The above and other objects, features and advantages of the present disclosure will become more apparent from the following detailed description made with reference to the accompanying drawings. In the drawings:

FIG. 7 is a diagram illustrating a relationship of pulse periods with bit strings of a normal data and a monitor data of FIG. 4;

FIG. 9 is a diagram illustrating a relationship of pulse periods with bit strings of a normal data and a monitor data outputted to a wiring from an interface circuit of FIG. 8;

DETAILED DESCRIPTION

Embodiments will be described based on the drawings. In the embodiments, like references are used to refer to like parts.

First Embodiment

Figure 1:
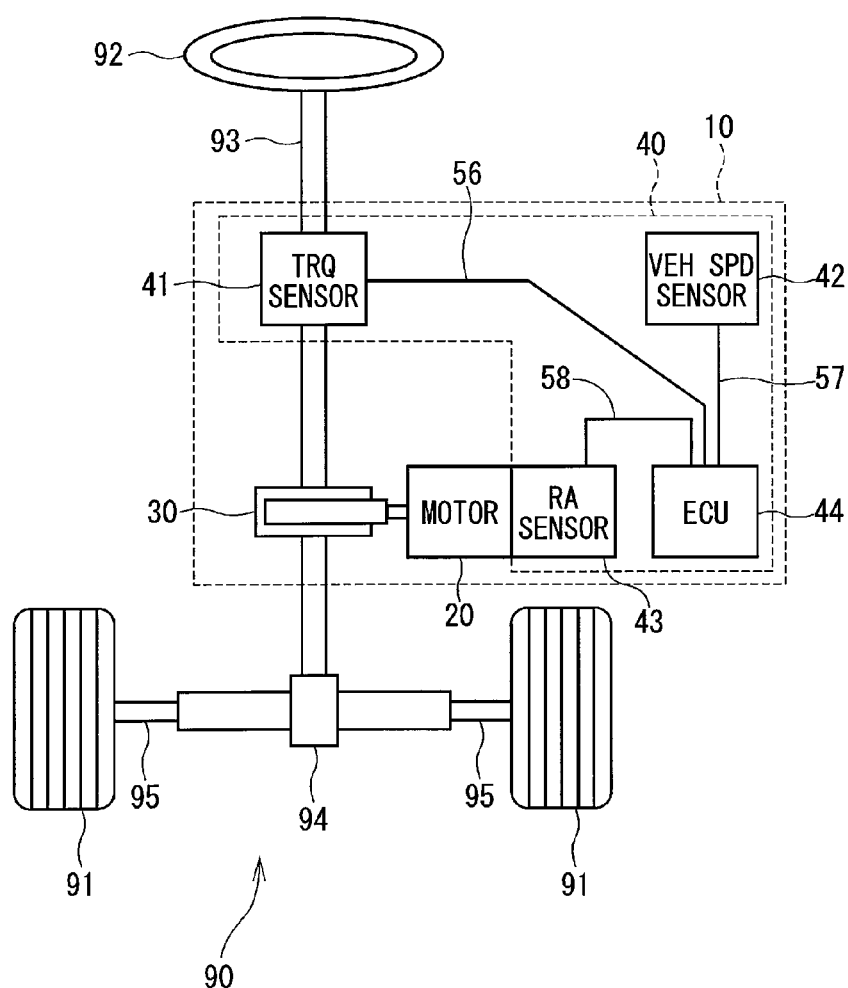
FIG. 1 is a diagram illustrating an electric power steering applied with an electronic control system of a first embodiment.

FIG. 1 illustrates an electric power steering applied with an electronic control system of a first embodiment. The electric power steering 10 is provided in a steering system 90. The steering system 90 is provided to operate a tire wheel 91 to change a traveling direction of a vehicle. The steering system 90 includes a steering wheel 92, a steering axis 93, a lack pinion mechanism 94, and a tie-rod 95. Rotational motion transmitted from the steering wheel 92 to the steering axis 93 is converted into a straight-line motion by the lack pinion mechanism 94, and transmitted to the tire wheel 91 through the tie-rod 95 to change a direction of the tire wheel 91. The electric power steering 10 is for assisting the steering operation by a driver.

A schematic configuration of the electric power steering 10 is explained with reference to FIG. 1 and FIG. 2. As shown in FIG. 1, the electric power steering 10 includes a motor 20, a speed reducer 30, and an electronic control system 40. The motor 20 generates assistant torque. The motor 20 is a three phase brushless motor. The speed reducer 30 reduces the rotation speed of the motor 20, and transmits it to the steering axis 93. In the present embodiment, the speed reducer 30 is a gear reducer.

The electronic control system 40 includes a torque sensor 41, a vehicle speed sensor 42, a rotational angle sensor 43, and a control unit 44. The torque sensor 41 detects the steering torque inputted into the steering axis 93. The vehicle speed sensor 42 detects a speed of the vehicle also called herein a vehicle speed. The rotational angle sensor 43 detects the rotation angle of the motor 20. The control unit 44 controls driving of the motor 20 based on the data transmitted from respective sensors.

In the present embodiment, the torque sensor 41, the vehicle speed sensor 42, and the rotational angle sensor 43 are provided at positions distant from the control unit 44 to some extent, and are connected to the control unit 44 by a harness including wirings 56, 57, and 58 serving as a transmission line. In FIG. 1 and subsequent FIGs, components in the harness other than the wiring 56, 57, and 58 are omitted. For example, power lines in the harness are omitted.

Figure 2:
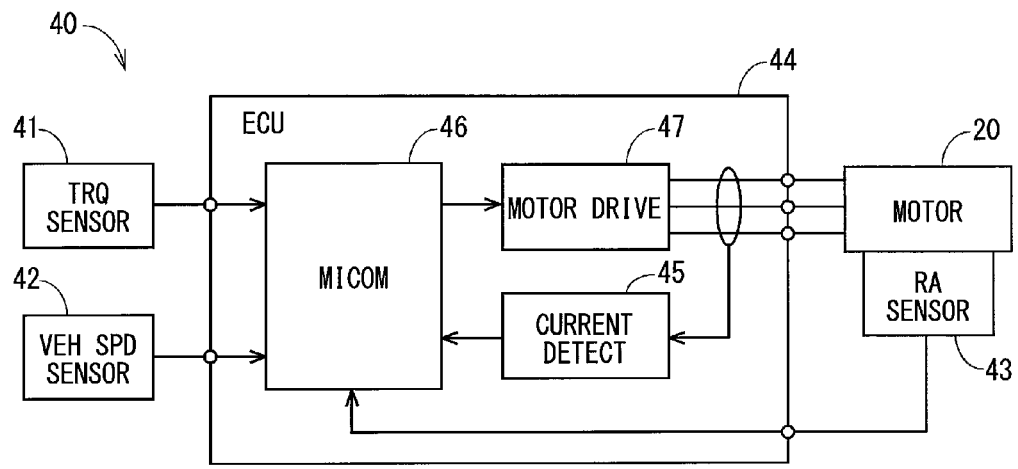
FIG. 2 is a block diagram illustrating an electronic control system of FIG. 1.

As shown in FIG. 2, the control unit 44 includes a current detector 45, a microcontroller 46, and a motor drive circuit 47. The current detector 45 detects a drive current of the motor 20, and outputs a detected current value to the microcontroller 46. Based on the data transmitted from respective sensors, the microcontroller 46 calculates a target current value, which is a target value of the drive current of the motor 20, and determines a command current value by comparing the target current value and the detected current value. The motor drive circuit 47 drives the motor 20 based on the command current value.

Next, the torque sensor 41 and the microcontroller 46 of the electronic control system 40 will be specifically explained with reference to FIG. 3, FIG. 4, and FIG. 5.

Figure 3:
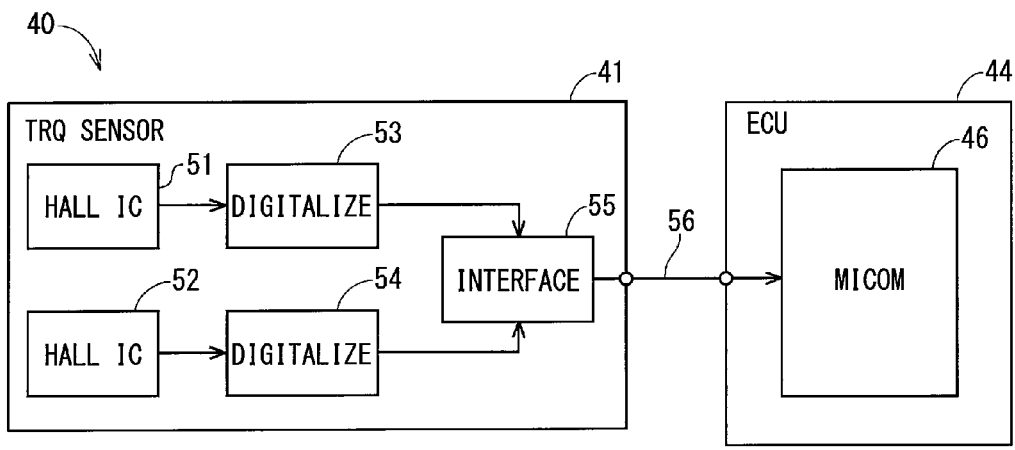
FIG. 3 is a block diagram illustrating a torque sensor of FIG. 2.

As shown in FIG. 3, the torque sensor 41 includes Hall ICs 51, 52, digitizing circuits 53, 54, and an interface circuit 55. Each of the Hall ICs 51 and 52 converts a steering torque value into an electric signal (analog signal). The digitizing circuits 53 and 54 convert the electric signals, which are outputted from the Hall ICs 51 and 52, into digital data. The Hall IC 51 and the digitizing circuit 53 correspond to a first detector. The Hall IC 52 and the digitizing circuit 54 correspond to a second detector.

The interface circuit 55 associates a normal data, which is the digital data outputted from the digitizing circuit 53, with a monitor data, which is a reversed data of the digital data outputted from the digitizing circuit 54, and outputs in turn the normal data and the monitor data to the wiring 56. In the present embodiment, each of the normal data and the monitor data, which is a data string representing the steering torque value, is divided into 4-bit data units. The normal data and the monitor data are stored in a frame along with other data, so that the frame is transmitted. The interface circuit 55 corresponds to an output portion.

Figure 4:
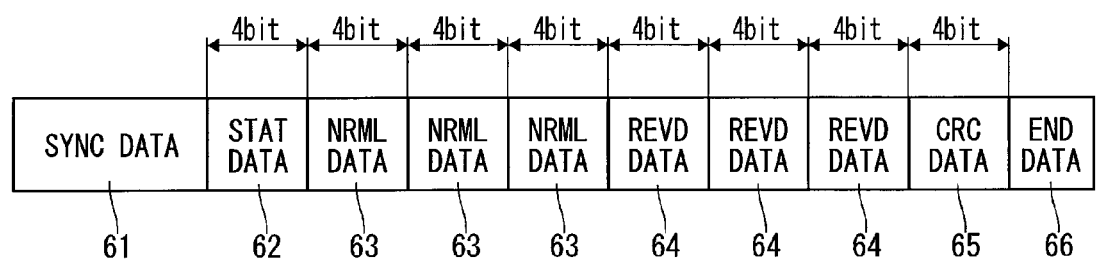
FIG. 4 is a diagram illustrating a frame configuration when a data is transmitted to a wiring from the interface circuit of FIG. 3.

As shown in FIG. 4, the data stored in the frame includes a synchronization data 61, a status data 62, three normal data 63, three monitor data 64, an error detection data 65 and an end data 66. The synchronization data 61 indicates the beginning of the frame. The status data 62 indicates information on the frame. The error detection data 65 is for checking an error during the transmission. A Cyclic Redundancy Check (CRC) may be adopted as an error checking method. The end data 66 indicates the end of the frame.

The data stored in the frame is transmitted in a form of a pulse signal that is compliant with standards SAE-J2716 of U.S. Society of Automotive Engineers. That is, between the torque sensor 41 and the control unit 44, the data is transmitted by SENT, which refers to Single Edge Nibble Transmission. As shown in FIG. 5, the pulse signal switches between 0V and 5V. The data includes a synchronizing pulse 71 representing the synchronization data, a status pulse 72 representing the status data, three normal data pulses 73 representing the normal data, three monitor data pulses 74 representing the monitor data, an error detection pulse 75 representing the error detection data, and an end pulse 76 representing the end data in this order from the beginning. In FIG. 5, the unit time in the time-axis is "tick". In the present embodiment, the unit time is set to, for example, 1 [tick]=1.5 [micro sec].

Figure 5:
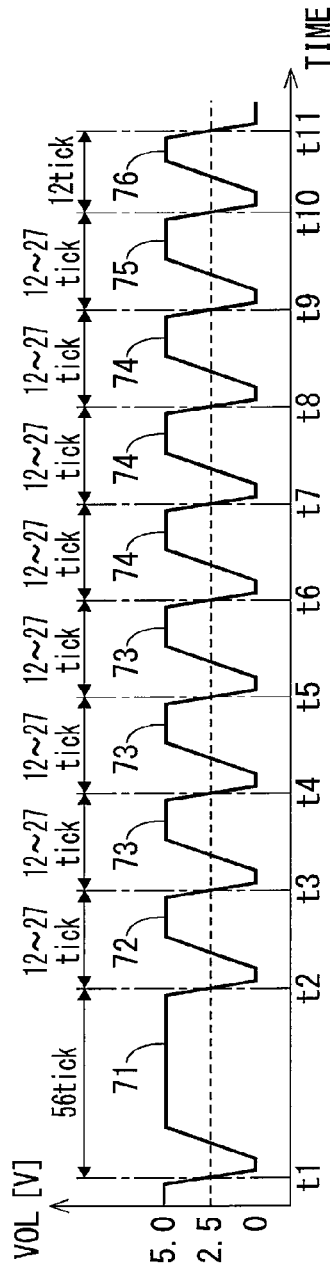
FIG. 5 is a diagram illustrating a pulse signal outputted to a wiring from an interface circuit of FIG. 3.

As shown in FIG. 5, the pulse signal has a section from a time point where a falling voltage passes through a predetermined threshold (t1 in the case of the synchronization pulse 71) to a time point where a rising voltage passes through the threshold (t2 in the case of the synchronization pulse 71). That is, the synchronization pulse 71 is between t1 and t2. The status pulse 72 is between t2 and t3. The first normal data pulse 73 is between t3 and t4. The second normal data pulse 73 is between t4 and t5. The third normal data pulse 73 is between t5 and t6. The first monitor data pulse 74 is between t6 and t7. The second monitor data pulse 74 is between t6 and t7. The third monitor data pulse 74 is between t8 and t9. The error detection pulse 75 is between t9 and t10. The end pulse 76 is between t10 and t11. The threshold is set to, for example, 2.5V.

Figure 6:
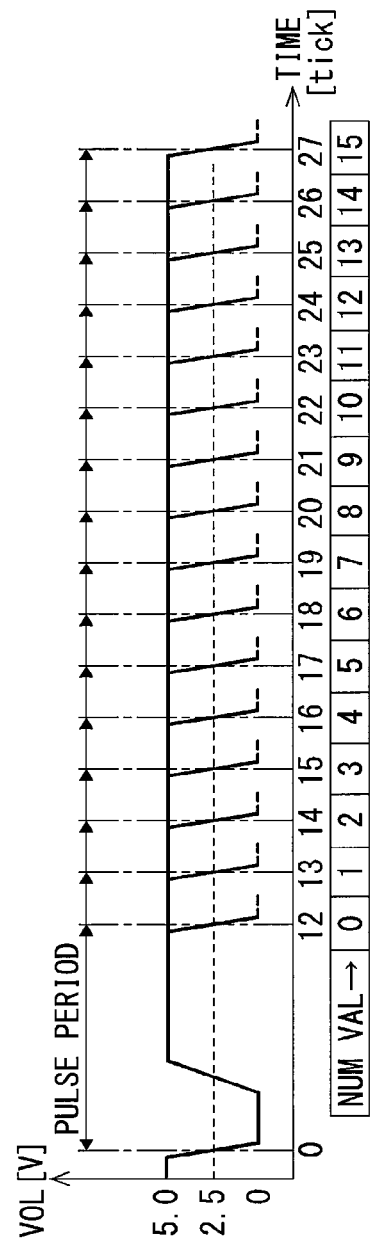
FIG. 6 is a diagram illustrating a relationship of a numeral value represented by a bit string with a pulse period, concerning a status pulse, a normal data pulse, a monitor data pulse and an error detection pulse of a pulse signal of FIG. 5.

As shown FIG. 6, the pulses 72, 73, 74, 75 of the pulse signal of FIG. 5 are set such that as a numeral value represented by the bit string of the corresponding data increases by 1, the pulse period increases by a predetermined time. Specifically, the bit string of the data corresponding to each pulse 72, 73, 74, 75 can have 16 different patterns "0000" to "1111" representing decimal numerical values "0" to "15". When the numerical value represented by the bit string is "0", the pulse period is set to 12 [tick]. When the numerical value represented by the bit string is "1", the pulse period is set to 13 [tick]. Subsequently, as the numerical value represented by the bit string increases by 1, the pulse period is set to increase by 1 [tick].

FIG. 7 collectively illustrates a relationship of the bit strings of the normal data and the monitor data with the pulse periods of the normal data and the monitor data. For example, when the bit string of the normal data is "0000", the bit string of the monitor data generated at the time same as the normal data is "1111." In this case, the pulse period of the normal data pulse is 12 [tick], and the pulse period of the monitor data pulse is 27 [tick]. The sum total of both pulse periods is 39 [tick].

For example, when the bit string of the normal data is "0001", the bit string of the monitor data generated at the same time as the normal data is "1110." In this case, the pulse period of the normal data pulse is 13 [tick], and the pulse period of the monitor data pulse is 26 [tick]. The sum total of both pulse periods is 39 [tick]. As can been above, the sum total of the pulse period of the normal data pulse and the pulse period of the monitor data pulse is always 39 [tick].

Description returns to FIG. 3. When the transmitted normal data 63 (FIG. 4) and a reversed data of the monitor data 64 (FIG. 4) associated with the frame do not match, the microcontroller 46 of the control unit 44 determines that at least one of the Hall IC 51, the Hall IC 52, the digitizing circuit 53, the digitizing circuit 54, the interface circuit 55 and the wiring 56 has failure. In the present embodiment, when the microcontroller 46 determines the above failure, the microcontroller 4 stops calculating the target current value based on the steering torque value acquired from the normal data 63 and other sensor values, stops assisting the steering wheel operation, and changes the steering system 90 into a manual steering state. The microcontroller 46 corresponds to a failure determination portion.

As described above, the torque sensor 41 of the electronic control system 40 of the first embodiment includes two detectors for converting the steering torque values, which are inputted into the steering axis 93, into the digital data. One of the detectors includes the Hall IC 51 and the digitizing circuit 53. The other of the detectors includes the Hall IC 52 and the digitizing circuit 54. The torque sensor 41 further includes the interface circuit 55. The interface circuit 55 outputs to the wiring 56 the frame storing the normal data and the monitor data. It is noted that the normal data is the digital data outputted from the digitizing circuit 53, and that the monitor data is a reversed data of the digital data outputted from the digitizing circuit 54.

The control unit 44 of the electronic control system 40 includes the microcontroller 46. When the transmitted normal data does not match a reversed data of the monitor data associated with the normal data, the microcontroller 46 determines that at least one of the Hall IC 51, the Hall IC 52, the digitizing circuit 53, the digitizing circuit 54, the interface circuit 55, and the wiring 56 has failure.

According to the first embodiment, the normal data is based on the digital data, which is detected by the Hall IC 51 and outputted by the digitizing circuit 53. The monitor data is based on the digital data, which is detected by the Hall IC 52 and outputted by the digitizing circuit 54. Therefore, when the Hall IC 51 fails for example, the control unit 44 can detect a data error on the basis of mismatching of a corresponding bit between the transmitted normal data and monitor data. Therefore, it is possible to improve reliability of the data transmitted from the torque sensor 41 to the control unit 44.

Moreover, in the first embodiment, the normal data and the monitor data are transmitted in the form of a pulse signal that contains the normal data pulse 73 representing the normal data and the monitor data pulse 74 representing the monitor data. The pulse signal is compliant with standards SAE-J2716 of U.S. Society of Automotive Engineers. The normal data pulse and the monitor data pulse are set such that as a numeral value of a bit string of a corresponding data increases by 1, its pulse period increases by 1 [tick]. Therefore, a sum total of the pulse period of the normal data pulse and the pulse period of the monitor data pulse are always kept at 39 [tick]. Therefore, the time variation in data transmission decreases, and the data transmission can be performed stably.

Moreover, in the first embodiment, because the data is transmitted by SENT, three wirings (VDD, GND, OUT) is sufficient for the total number of wirings of the harness connecting the torque sensor 41 and the control unit 44. In contrast, when the data transmission is performed by other serial communications such as SPI communication for example, five wirings (VDD, GND, CLK, SCI, SCO) is required for the total number of wirings of the harness. Therefore, the first embodiment can reduce the cost of the harness. When the data is transmitted by SENT, there may be concern about the reduction in transmission speed compared with the SPI communication. Typically, when two data each having the data string 1111 are transmitted in parallel by SENT, the sum total of the pulse periods are 54 [tick]. By contrast, in the first embodiment, because one of the two data is reversed and transmitted, the sum total of the pulse periods is reduced to 39 [tick]. Therefore, the first embodiment can improve the transmission speed in SENT data transmission.

Moreover, in the first embodiment, the electronic control system 40 is applied to the electric power steering 10. That is, the torque sensor 41 of the electronic control system 40 detects the steering torque inputted into the steering axis 93, and the control unit 44 controls the driving of the motor 20 based on the data transmitted from the torque sensor 41 etc. Therefore, by improving the reliability of the data transmitted from the torque sensor 41 to the control unit 44, it becomes possible to safely control the motor 20.

Second Embodiment

Figure 8:
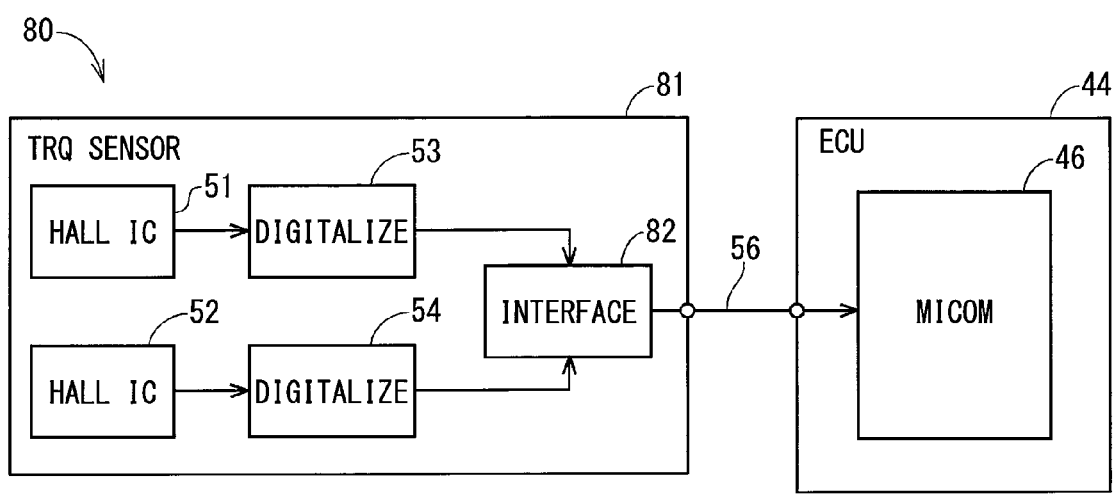
FIG. 8 is a block diagram illustrating a torque sensor of an electronic control system of a second embodiment.

An electronic control system of a second embodiment will be described with reference to FIG. 8 and FIG. 9. In the second embodiment, when a predetermine condition is met, the interface circuit 82 of the torque sensor 81 of the electronic control system 80 provides as the monitor data the reversed data of the digital data outputted from the digitizing circuit 54. When the predetermine condition is not met, the interface circuit 82 provides as the monitor data the digital data outputted from the digitizing circuit 54. The above-mentioned predetermined condition is that the 4-bits digital data outputted from the digitizing circuit 54 is in a range "1000" to "1111".

FIG. 9 collectively illustrates a relationship of the bit strings of the normal data and the monitor data with the pulse periods of the normal data and the monitor data. For example, when the bit string of a normal data is "0000", the monitor data made at the same time as this normal data is set to "0000." In this case, the pulse period of the normal data pulse is 12 [tick], and the pulse period of the monitor data pulse is 12 [tick]. The sum total of both pulse periods is 24 [tick]. In this manner, until the bit string of the normal data becomes "0111", the sum total of both pulse periods increases by 2 [tick] as the bit string of the normal data increases by 1.

When the bit string of the normal data is "1000", the monitor data made at the same time as this normal data is set to "0111." In this case, the pulse period of the normal data pulse is 20 [tick], and the pulse period of the monitor data pulse is 19 [tick]. The sum total of both pulse periods is 39 [tick]. Subsequently, the sum total of the pulse period of the normal data pulse and the pulse period of the monitor data pulse is always set to 39 [tick].

According to the second embodiment, the data error resulting from failure of the Hall IC 51 can be detected and the reliability of the transmitted data can improve, as in the first embodiment. Furthermore, in the second embodiment, when the bit string of the normal data is in a range between "1000" to "1111", the sum total of the pulse period of the normal data pulse and the pulse period of the monitor data pulse is always kept at 39 [tick]. When the bit string of the normal data is in a range "0000" to "1000", the sum total of the pulse period of the normal data pulse and the pulse period of the monitor data pulse is smaller than 39 [tick]. Therefore, as a whole, a time taken for data transmission can be shortened. The second embodiment can further improve transmission speed in transmitting the data by SENT.

Third Embodiment

Figure 10:
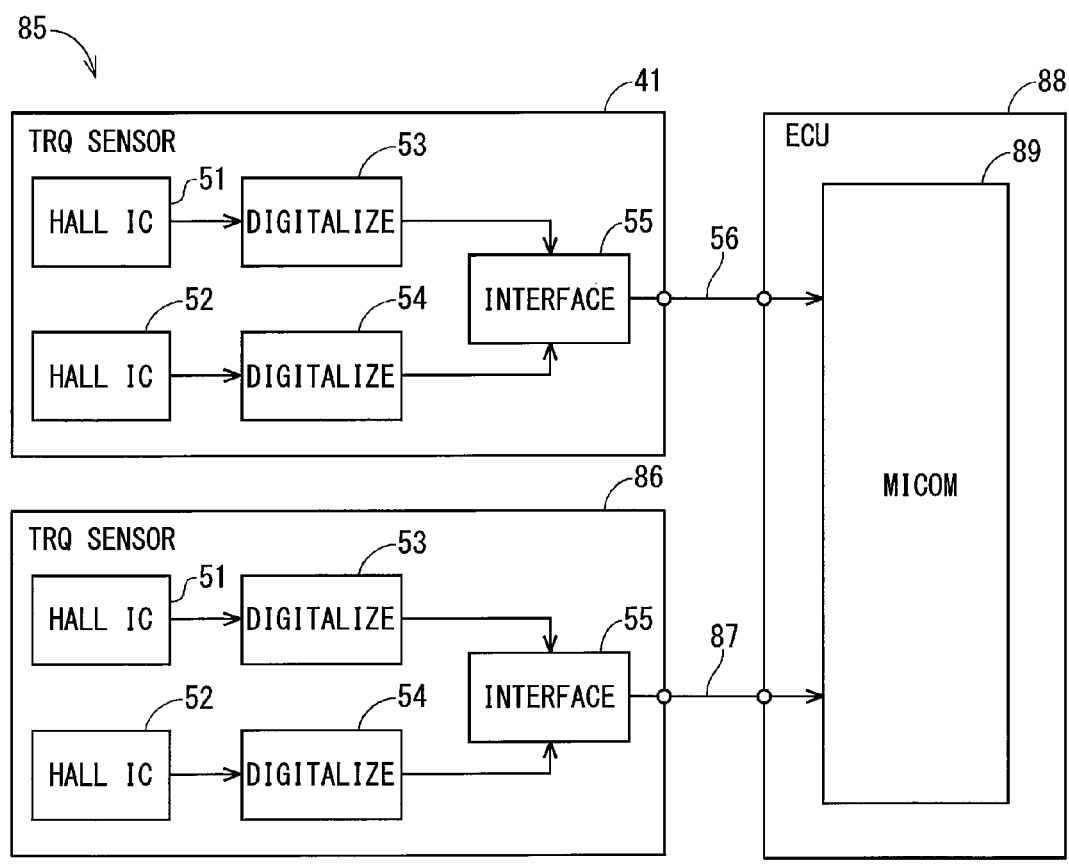
FIG. 10 is a block diagram illustrating a torque sensor of an electronic control system of a third embodiment.

An electronic control system of a third embodiment will be described with reference to FIG. 10. In the third embodiment, the electronic control system 85 is provided with two systems each having the torque sensor and the wiring. The first system has the torque sensor 41 and the wiring 56. The second system has the torque sensor 86 and the wiring 87. The torque sensor 86 and the wiring 87 are constructed as the same as the torque sensor 41 and the wiring 56.

The torque sensor 41 transmits data to the microcontroller 89 of the control unit 88 through the wiring 56. This transmitted data is used for calculating a target current value of the motor of the electric power steering. The torque sensor 86 transmits the data to the microcontroller 89 through the wiring 87. This transmitted data is used for monitoring the data transmitted by the torque sensor 41. In the third embodiment, it is possible to provide the same technical effect as in the first embodiment. Furthermore, because the data transmitted by the torque sensor 41 is monitored by using the data transmitted by the torque sensor 86, the reliability of the data transmitted by the torque sensor 41 can further improve. Furthermore, when the failure of the torque sensor 41 is determined, the torque sensor 41 is stopped and the motor 20 is controlled based on the data transmitted by the torque sensor 86. Therefore, without stopping the assist torque, it is possible to continue the assistance in a reliability-improved state.

Other Embodiment

In other embodiments, the data transmitted from the torque sensor to the control unit may be transmitted in the form of other signals than the signal that is compliant with standards SAE-J2716 of U.S. Society of Automotive Engineers.

In other embodiments, when the microcontroller determines that the torque sensor or the wiring has failure, the microcontroller may restrict assistance of the operation of the steering wheel. Restricting assistance may be, for example, reducing the assist torque, restricting an assist amount to a constant value regardless of the vehicle speed, or the like.

Figure 11:
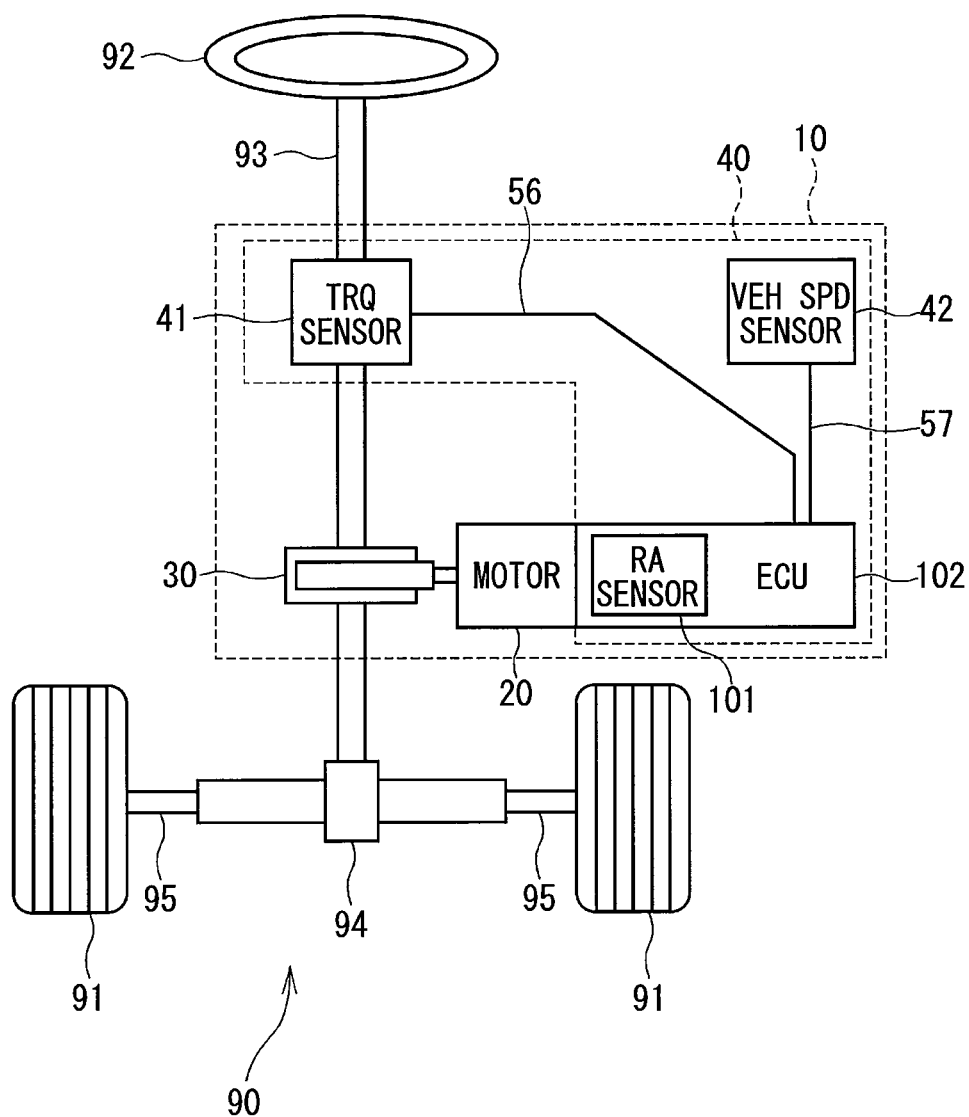
FIG. 11 is a diagram illustrating an electric power steering applied with an electronic control system of other embodiments.

In other embodiments, as shown in FIG. 11, the motor 20 and the rotational sensor 101 may be integrated with the control unit 102. In this case, the rotation sensor 101 is, for example, mounted on a board (e.g., circuit board) of the control unit 102.

In other embodiments, the electronic control system may be provided with a sensor other than the torque sensor. The electronic control system may be provided with a control unit that controls an apparatus other than the motor of the electric power steering.

Embodiments of the present disclosure have been illustrated above. However, the above-illustrated embodiments do not limit embodiments of the present disclosure and can be variously modified without departing from the spirit of the present disclosure. For example, embodiments of the present disclosure include an embodiment provided by combining technical parts in different embodiments above and an embodiment provided as part of the embodiment above.

What is claimed is:

1. An electronic control system comprising:
a control unit;
a first system including a first sensor and a first transmission line, the first sensor being capable of transmitting first data to the control unit via the first transmission line; and
a second system including a second sensor and a second transmission line, the second sensor being capable of transmitting second data to the control unit via the second transmission line, wherein:
the first sensor includes
a first detector and a second detector each converting a physical quantity representing a state of a detection target into a digital data and
an output portion outputting in turn a normal data and a monitor data associated with each other to the transmission line, wherein the normal data is the digital data outputted from the first detector, wherein the monitor data is, unconditionally or when a predetermined condition is met, a reversed data of the digital data outputted from the second detector; and
the control unit includes
a failure determination portion
determining that at least one of the first detector, the second detector, the output portion and the transmission line has failure when the monitor data is the reversed data of the digital data outputted from the second detector and a reversed data of the monitor data does not match the normal data and
determining that at least one of the first detector, the second detector, the output portion and the transmission line has failure when the monitor data is not the reversed data of the digital data outputted from the second detector and the monitor data does not match the normal data; and
the control unit is configured to monitor the first data transmitted from the first sensor using the second data transmitted from the second sensor and determine a failure in the first system based on the monitoring of the first data using the second data.

2. The electronic control system according to claim 1, wherein:
the normal data and the monitor data are transmitted in a form of a pulse signal that contains a normal data pulse representing the normal data and a monitor data pulse representing the monitor data;
a pulse period of the normal data pulse increases by a predetermined time as a numeral value represented by a bit string of the normal data increases by 1; and
a pulse period of the monitor data pulse increases by a predetermined time as a numeral value represented by a bit string of the monitor data increases by 1.

3. The electronic control system according to claim 2, wherein:
the pulse signal is compliant with standards SAE-J2716 of U.S. Society of Automotive Engineers.

4. The electronic control system according to claim 1, wherein:
the first includes a torque sensor detecting a steering torque inputted into a steering axis of an electric power steering; and
the control unit includes
a target value calculator calculating a target value of a drive current of a motor of the electric power steering based on the steering torque detected by the torque sensor and
a motor driver driving the motor based on the target value.

5. The electronic control system according to claim 4, wherein:
the control unit integrally includes a rotation sensor detecting a rotation angle of the motor.

6. The electronic control system according to claim 1, wherein:
the normal data is the digital data outputted from the first detector;

the monitor data is the reversed data of the digital data outputted from the second detector;

the normal data is transmitted in a form of a pulse signal representing a normal data pulse;

the monitor data is transmitted in a form of a pulse signal representing a monitor data pulse;

a pulse period of the normal data pulse increases by a predetermined time as a numeral value represented by a bit string of the normal data increases by 1;

a pulse period of the monitor data pulse increases by a predetermined time as a numeral value represented by a bit string of the monitor data increases by 1; and a total sum of the pulse period of the normal data pulse and the pulse period of the monitor data pulse is always constant.

7. The electronic control system according to claim 1, wherein the control unit is further configured to stop operation of the first system and provide control of a control target using the second system, when the failure in the first system is determined by the control unit.

* * * * *